Nov. 14, 1961     R. E. BECKER     3,008,686

AIR BLEEDER VALVE

Filed July 20, 1959

INVENTOR.

Robert E. Becker,

BY Parker & Carter

Attorneys.

3,008,686
AIR BLEEDER VALVE
Robert E. Becker, Logansport, Ind., assignor to Logansport Machine Co., Inc., Logansport, Ind., a corporation of Indiana
Filed July 20, 1959, Ser. No. 828,307
1 Claim. (Cl. 251—320)

This invention relates to fluid bleeder valves and in particular to a bleeder valve having simple means for the adjustment thereof.

One purpose of the present invention is to provide a simply constructed bleeder valve having tight seal-off.

Another purpose is to provide an air bleeder valve wherein all adjustments thereto are made from inside of the valve.

Another purpose is to provide an easily operated, low cost fluid bleeder valve.

Other purposes will appear in the ensuing specification, drawings and claims.

The invention is illustrated diagrammatically in the following drawings wherein.

Figure 1:
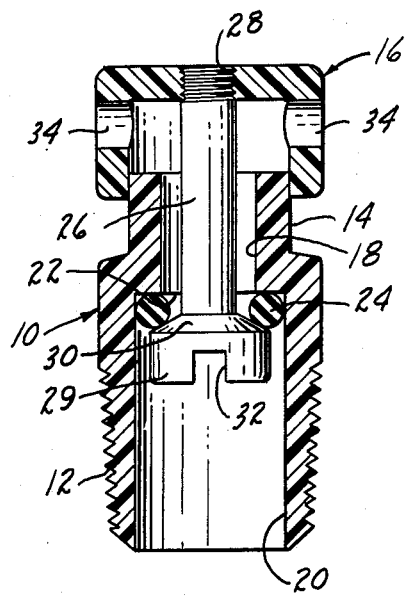
FIGURE 1 is a half section of an improved bleeder valve.

Referring now to the drawings, a generally cylindrical body member, indicated generally at 10, has an exteriorly threaded portion 12 and a reduced cylindrical portion 14 adapted to receive a cap member indicated generally at 16. The cap member 16 has an inner diameter generally equal to or slightly greater than the diameter of the portion 14 so that the cap may be rotatably and axially movable thereon. The exterior of the body member 10 is completed by a tool gripping surface 15 between the portions 12 and 14.

The body member 10 has a generally axial bore or passage 18 passing therethrough, a portion of which, 20, has an enlarged diameter. The bore 18 cooperates with the enlarged portion thereof 20 to define an annular shoulder 22 which is adapted to receive an annular sealing ring or the like 24. The sealing ring 24 may be formed of rubber or any other resilient sealing material.

A plunger indicated generally at 26 has one end 28 threadedly engaged with the cap member 16. The plunger, which is in the form of a screw, may be of the self-locking type. The opposite end of the plunger has an enlarged head portion 29, the outer diameter of which is greater than the diameter of the bore portion 18. The head portion 29 has a tool engaging slot 32 and a slanted annular wall 30 which is adapted to seat against the annular sealing ring 24. The ratio of the diameter of stem 26 and the inner diameter of ring 24 is such that the high escape velocity of the air will not dislodge the ring from the shoulder 22.

The cap member 16 has a plurality of exhaust ports 34 which are in communication with the interior of the cap and so connect to the bore 18. As shown in FIG. 1, when the enlarged head portion of the plunger is seated against the annular sealing ring, the bore portion 20 is sealed off from the interior of the cap and from the exhaust ports.

The use, operation and function of the invention are as follows:

A bleeder valve, such as shown herein, is extremely simple to produce and may be produced at very low cost. In the normal use of such a bleeder valve, the body member is attached by means of threads 12 to a pressure system with the enlarged bore portion 20 in communication with air or fluid under pressure. The invention is particularly applicable to an air pressure system, however, it is also suitable for other types of fluid pressure systems. This valve is quite simple to operate in that the cap 16 need only be depressed in order to bleed off air pressure from the enlarged portion 20.

Before the body member is screwed into the air pressure system, the plunger or screw 26 is fitted within the body portion and the cap 16 is secured thereto. The tool engaging the slot 32, which is adapted to receive any tool, for example a screw driver, permits the complete adjustment of my bleeder valve from within the body member. The enlarged head portion of the plunger is seated against the sealing ring 24, which has been previously placed within the body member, and then the plunger is screwed into the cap until the proper length of plunger has been obtained, whereby when the cap is depressed, the exhaust ports are in communication with the bore portion 20 and the fluid pressure system.

Figure 2:
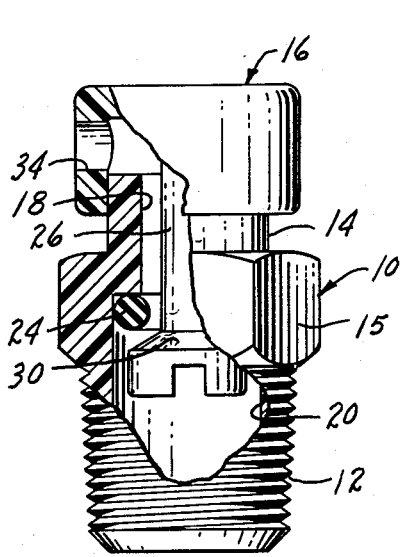
FIGURE 2 is a side elevation, with parts cut away, of the valve of FIGURE 1, with the cap depressed.
Figure 3:
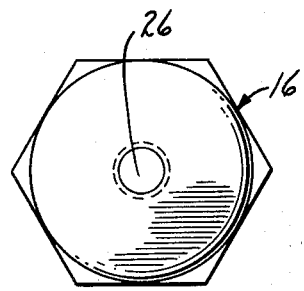
FIGURE 3 is a top plan view of the bleeder valve of FIGURE 1.

Once the unit has been assembled and has been placed in a pressure system, the fluid under pressure forces the plunger upwardly, as shown in FIGURE 1, so that the enlarged head portion seals the pressure system from the exhaust ports. In order to bleed off the fluid pressure, cap member 16 is depressed, as shown in FIGURE 2, which causes the plunger to move downward within the valve. When the plunger moves away from the sealing means, the bore portion 20 is in communication with the exhaust ports and the fluid under pressure will be exhausted through the ports 34. Once the cap is released, the force of the fluid under pressure will force the plunger back against the sealing means and again shut off the exhaust ports from the pressure system.

An important feature of my invention is its extreme simplicity and ease of construction. There are only four parts to my valve, and the assembly thereof only necessitates positioning the seal ring and screwing the plunger into the cap.

Whereas I have described and shown a preferred form of the invention, it should be realized that there are many modifications, substitutions and additions thereto. For example, the particular material of which the cap and body members are formed is not essential, however, I have found that plastic as well as metal are suitable materials. The screw or plunger may be nylon, plastic, or metal. Additionally, the valve has been shown as having exterior threads so that it may be mounted into a pressure system. It should be realized that my invention is not limited thereo, but includes any type of valve which may be mounted into a pressure system and which provides means for complete adjustment of the valve from within.

Another important feature of the invention is the fact that the bleeder valve can only be taken apart from within. Many air valves or bleeder valves can be taken apart from the outside. However, in the bleeder valve shown herein, the only adjustment and means of assembly is the plunger which is completely contained within the valve. I have therefore eliminated the possibility of the valve coming apart through outward rough handling or by disassembly from the outside.

I claim:

A bleeder valve including a generally cylindrical body member having an axial bore therein and a radially reduced outer surface portion at one end, a cap member having an exhaust port therein movably mounted on said reduced portion whereby the interior of said cap is in communication with said bore, said cap including a sidewall and a top wall, said exhaust port being adjacent the top wall and being in communication with said bore in all positions of said cap the inner diameter of said cap sidewall being slightly larger than the diameter of said reduced portion, a tool gripping surface extending outwardly from said body member adjacent said reduced portion and forming a stop for said movable cap a plunger threadedly secured to said cap and mounted for reciprocation in said body member, said bore having an enlarged portion adapted to communicate with a source of fluid under pressure, said plunger having an enlarged head portion movable in said enlarged bore portion the diameter of said head portion being less than the diameter of said enlarged bore portion, said bore and the enlarged portion thereof cooperating to define an annular shoulder, an annular sealing ring positioned against said shoulder, said enlarged head portion having an annular slanted surface cooperating with said sealing ring to seal said enlarged bore portion from the interior of said cap said plunger being normally biased against said sealing ring by the fluid under pressure, said enlarged plunger portion further including a tool receiving means for use in adjusting the length of said plunger, initial movement of said cap toward said abutment being effective to move said slanted surface away from said seal ring and to place said exhaust port in communication with said source of fluid pressure.

References Cited in the file of this patent

UNITED STATES PATENTS

| 1,137,597 | Feagler | Apr. 27, 1915 |
| 2,706,660 | Johnson et al. | Apr. 19, 1955 |

FOREIGN PATENTS

| 499,310 | Belgium | Nov. 30, 1950 |
| 1,085,396 | France | Feb. 2, 1955 |
| 1,096,845 | France | Feb. 9, 1955 |